_United States Patent_ [19]

Kashyap

[11] Patent Number: 6,141,469
[45] Date of Patent: Oct. 31, 2000

[54] MULTI-BAND-PASS FILTER

[75] Inventor: Raman Kashyap, Suffolk, United Kingdom

[73] Assignee: British Telecommunications puplic limited company, London, United Kingdom

[21] Appl. No.: 09/180,297

[22] PCT Filed: Jun. 17, 1998

[86] PCT No.: PCT/GB98/01761

§ 371 Date: Nov. 5, 1998

§ 102(e) Date: Nov. 5, 1998

[87] PCT Pub. No.: WO98/59269

PCT Pub. Date: Dec. 30, 1998

[30] Foreign Application Priority Data

Jun. 20, 1997 [EP] European Pat. Off. ............ 97304350

[51] Int. Cl.[7] .............................. G02B 6/26; G01B 9/02
[52] U.S. Cl. .............................. 385/27; 385/24; 385/31; 385/37; 356/345
[58] Field of Search .................... 385/15, 24, 27, 385/28, 29, 31, 42, 37; 356/345, 359

[56] References Cited

U.S. PATENT DOCUMENTS

| | | | |
|---|---|---|---|
| Re. 35,516 | 5/1997 | Henry et al. ........................... 385/27 |
| 5,309,534 | 5/1994 | Cohen et al. ........................... 385/27 |
| 5,351,317 | 9/1994 | Weber .................................... 385/27 X |
| 5,598,300 | 1/1997 | Magnusson et al. .................. 359/566 |
| 5,615,289 | 3/1997 | Duck et al. ............................ 385/24 |
| 5,647,037 | 7/1997 | Byron ..................................... 385/27 |
| 5,828,802 | 10/1998 | Stolen et al. ........................... 385/27 |
| 5,887,092 | 3/1999 | van der Tol ........................... 385/27 |
| 5,940,556 | 8/1999 | Moslehi et al. ........................ 385/28 |
| 6,021,242 | 2/2000 | Harumoto et al. ..................... 385/37 |
| 6,061,484 | 5/2000 | Jones et al. ............................ 385/24 |

FOREIGN PATENT DOCUMENTS

| 0724173A1 | 7/1996 | European Pat. Off. ............. 385/27 X |
|---|---|---|
| 2297656 | 7/1996 | United Kingdom ................. 385/27 X |

OTHER PUBLICATIONS

Giallorenzi et. al., "Optical Fiber Sensor Technology", IEEE Jour. of Quantum Electronics vol. QE–18, No. 4, Apr. 1982, pp. 626–664.

Nykolak et. al. "All–Fiber . . . Router" IEEE Phot. Lett. vol. 9 No. 5 May 1997 pp. 605–606.

Tervonen et. al. "A Guided–Wave . . . Multiplexing" IEEE Phot. Lett. vol. 3 No. 6 Jun. 1991.

_Primary Examiner_—Brian Healy
_Attorney, Agent, or Firm_—Nixon & Vanderhye P.C.

[57] ABSTRACT

A multiple band pass optical filter comprises an interferometer, such as a Michelson interferometer, with de-tuned reflective Bragg gratings 8, 9 that produce multiple, separate, substantially equal reflectivity pass bands for light passing from the interferometer's input port P1 to output port P2.

32 Claims, 5 Drawing Sheets

MULTI-BAND-PASS FILTER

FIELD OF THE INVENTION

This invention relates to a multi-band-pass filter having particular but not exclusive application to wavelength division multiplexed (WDM) communication systems for filtering individual WDM channels.

BACKGROUND OF THE INVENTION

Hitherto, it has been proposed to select narrow pass bands from a relatively broad band optical source such as an optical laser, using Bragg-matched reflection gratings, for example recorded in an optical fibre. For a general review, reference is directed to Photosensitive Optical Fibres: Devices and Applications, R. Kashyap, Optical Fibre Technology 1, 17–34 1994. As explained in this review paper, band pass filters can be constructed for filtering out several wavelengths in a narrow range of a few nanometers based on a Michelson Interferometer as proposed by D. C. Johnson et al, "New Design Configuration for a Narrow Band Wavelength Selective Optical Tap and Combiner" Electron. Lett. Vol. 23, 668 (1987). In this configuration, a pair of Bragg matched reflection gratings are carefully positioned in the arms of the Michelson Interferometer so that the optical path lengths to and from the gratings are identical. Thus, the device is carefully tuned in terms of the matching of the gratings and the path length.

In WDM bandpass filters, it is usually necessary to select a number of different pass bands centred on different wavelengths. Hitherto, it has been proposed to include a number of pairs of identical gratings in each arm of the interferometer, as discussed by Kashyap, supra. However, the resulting structure is inflexible because the wavelengths of the pass bands are fixed by the characteristics of the individual pairs of tuned gratings, and the device is difficult to set up for use with desired pass bands.

SUMMARY OF THE INVENTION

The present invention provides an alternative approach, in which the filter is deliberately de-tuned in order to provide a plurality of separate pass bands.

More particularly, in accordance with the invention there is provided a multiband-pass filter comprising: a splitter operative to split optical radiation incident thereon into first and second optical paths, a combiner to combine optical radiation from the first and second paths to provide an optical filter output, and reflective means in the paths, to reflect optical radiation from the splitter to the combiner, the reflective means being de-tuned so that the filter output provides a plurality of separate, wavelength spaced pass bands for the incident radiation.

The reflective means may be de-tuned in different ways. The optical path lengths presented to the radiation travelling from the splitter to the combiner may be sufficiently different to produce the plurality of separate pass bands in the filter output. Also, the reflective means may exhibit respective different pass bands for the incident radiation, in reflection, for the first and second paths, which on combination in the combiner, result in the plurality of separate pass bands in the filter output.

The splitter may be operative to split incident relatively broadband optical radiation into the first and second paths, and the reflective means may include first and second reflective elements in the paths respectively, each having a relatively narrow band reflective characteristic for reflecting radiation from the splitter to the combiner. The plurality of pass bands in the filter output may be disposed within the envelope of the reflection pass band of at least one of the reflective elements. The path lengths presented by the first and second paths may differ by a length greater than that corresponding to a wavelength of the radiation reflected by the individual reflective elements.

The reflectivity to incident radiation presented in the filter output may be such that the reflectivity in each of the pass bands has substantially the same maximum value, within at least a given range of the output.

Stated differently, the invention provides a multiple pass band optical filter comprising an interferometer with relatively detuned reflective elements that produce multiple, separate, substantially equal reflectivity pass bands in the interferometer's output.

The invention also includes a method of configuring multi-band pass filter that comprises a splitter operative to split incident optical radiation within a given bandwidth into first and second optical paths, a combiner to combine optical radiation from the first and second paths to provide an optical filter output, and reflective means in the paths respectively, to reflect radiation from the splitter to the combiner, the method comprising: de-tuning the reflective means so that the filter output provides a plurality of separate pass bands for the incident radiation each centered on a different wavelength within the bandwidth.

The filter according to the invention has the advantage that a single pair of reflective elements can provide multiple pass bands, significantly simplifying the structure. Furthermore, the device is not resonant in the manner of a prior art Fabry Perot device thereby minimising cross talk between the pass bands.

BRIEF DESCRIPTION OF THE DRAWINGS

In order that the invention may be more fully understood, embodiments thereof will now be described by way of example with reference to the accompanying drawings in which.

DETAILED DESCRIPTION

Figure 1:
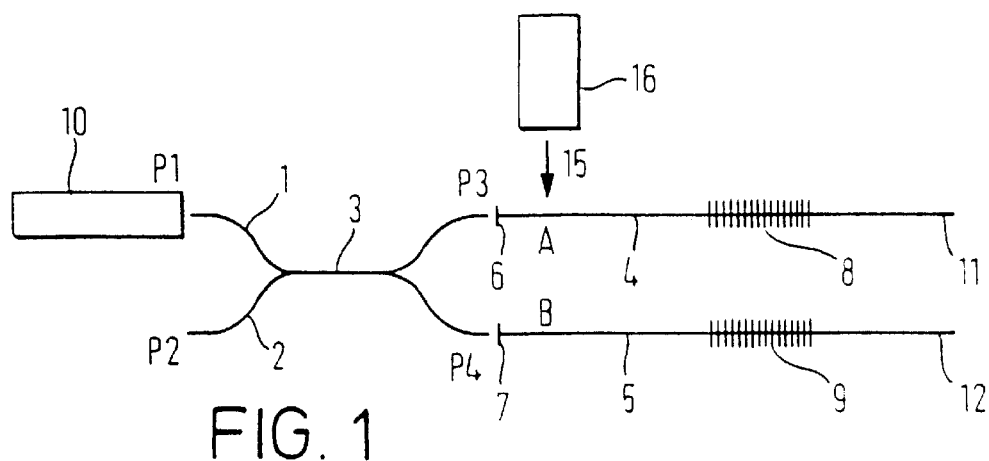
FIG. 1 is a schematic diagram of a Michelson interferometer for use in explaining the invention.

An example of a prior Michelson interferometer bandpass filter will firstly be described with reference to FIG. 1. The interferometer comprises a four port coupler formed from two lengths of silica optical fibre 1, 2 which are fused together in region 3 to form a 50:50 coupler, which, as will be explained in more detail hereinafter, is used as a splitter and a coupler. Four port couplers of this nature are well known in the art and reference is directed to Gillorenzi D. G. et al, "Optical Fibre Sensor Technology" IEEE J. Quant. Elec, Vol QE 18, pp626–665, 1982. The coupler is configured so that its splitting/coupling ratio is substantially independent of wavelength for the wavelength range of interest, to be described in more detail hereinafter. Each length of fibre 1, 2 consists of a core of diameter 8μm surrounded by a cladding of external diameter 125 μm the core being having a refractive index of 1.460 in the 1550 μm telecommunications band whereas the surrounding cladding has a refractive index of 1.454, so that the refractive index difference between the core and the cladding δn is $6 \times 10^{-3}$. As is well known in the art, the cladding regions of the fibres are merged together by a fusing process over a length typically of the order of 2–3 mm so as to bring the cores close to one another to achieve evanescent coupling.

The resulting coupler has first and second input ports P1, P2, and output ports P3, P4. First and second lengths of photosensitive optical fibre 4, 5 are spliced to the output ports P3, P4 respectively, by means of fusion splices 6, 7. The photosensitive fibres 4, 5 comprises a core of diameter 8 μm surrounded by a cladding of external diameter 125 μm. The core is formed of germanium doped silica, surrounded by a silica cladding. The resulting fibre exhibits a photosensitivity to ultraviolet light in a manner well known in the art. The fibre may be loaded with hydrogen by conventional techniques to enhance the photosensitivity. The coupler itself may be of photosensitive fibre in which case the gratings may be formed directly in the arms of the coupler to avoid the need for the splices 6, 7. Identical refractive index gratings 8, 9 are recorded in the photosensitive fibres 4, 5. Reference is directed to K. O. Hill et al "Photosensitivity in Optical Waveguides: Application to Reflection of Filter Fabrication", Appl. Phys. Lett. Vol. 32, No. 10, 647 (1978). Each grating can be produced by forming an optical interference pattern between two interfering beams of UV radiation, and exposing the optical fibre to the interfering pattern so as to record a grating in the fibre. The interference pattern may be formed by directing an optical beam longitudinally through the fibre and reflecting it back along its path through the fibre, so as to form a standing wave pattern, which becomes recorded in the fibre due to its photosensitivity. In an alternative method, beams are derived from a coherent source and directed transversely of the length of the fibre, so as to interfere with one another and produce an interference pattern externally of the fibre, which becomes recorded in the fibre as a result of its photosensitivity. A block for producing an external interference pattern for this purpose is described in EP-A-0 523 084.

Another way of forming the grating is to use a phase mask in which the desired amplitude pattern has been recorded holographically as a masked pattern. The masked pattern is placed adjacent to the fibre and is illuminated with laser radiation so as to expose the fibre to the holographic pattern. Reference is directed to K. O. Hill et al "Bragg Grating Refracted In Mono-mode Photosensitive Fibre by UV Exposure to a Phase Mask" Appl. Phys. Lett. Vol. 62, No. 10, 1035 (1993).

For a general review of refractive index gratings, reference is directed to "Photosensitive Optical Fibres: Devices and Applications", R. Kashyap, supra.

The gratings 8, 9 are of identical length, typically 0.4 mm, with identical spatial periodicities. Incident light is directed into port P1, the incident light being produced by means of a laser operating at 1480 nm which pumps a doped fibre amplifier 10 to produce light in a relatively broadband centred on 1550 nm and with a bandwidth of the order of 40 nm. Alternatively a ELED can be used as the source of incident radiation. The light entering port P1 is split in the coupling region 3 of the coupler, into two 50% components that are directed towards the output ports P3, P4 respectively. As is well known in the art, the 50% component which is coupled from the port P1 to the port P4 undergoes a π/2 phase change, so that a π/2 phase difference occurs in the radiation leaving the ports P3, P4. Light from the output ports P3, P4 is directed to the fibre gratings 8, 9 respectively and, at a Bragg wavelength $\lambda_{Bragg}$ corresponding to the spatial periodicity of the gratings 8, 9 is reflected back towards the ports P3, P4 respectively along the first and second paths defined by the fibres 4, 5 between the ports P3, P4 and the gratings 8, 9 respectively. Assuming that the optical path lengths between the ports P3, P4 and the gratings 8, 9 are identical, light reflected back to the ports P3, P4 at the Bragg wavelength $\lambda_{Bragg}$ enters the coupler with a π/2 phase difference. Due to the characteristics of the coupler, light reflected back to the input port P4 from grating 9 is split by the coupler in the region 3 into a component which passes to the port P2 with no phase change, and a component that passes to the port P1, which undergoes a π/2 phase change. Similarly, for light reflected back by grating 8 to the input port P3, a component passes directly to the port P1, with no phase change, and a component passes through the coupler to the port P2 after undergoing a π/2 phase change. As known in the art, the two components which pass to the port P1 are π out of phase and thus interfere to produce zero output. However, the components passing to the port P2 are in phase and constructively add to one another. Thus, an output occurs solely at the output port P2, at the Bragg wavelength $\lambda_{Bragg}$ defined by the identical gratings 8, 9.

Figure 2:
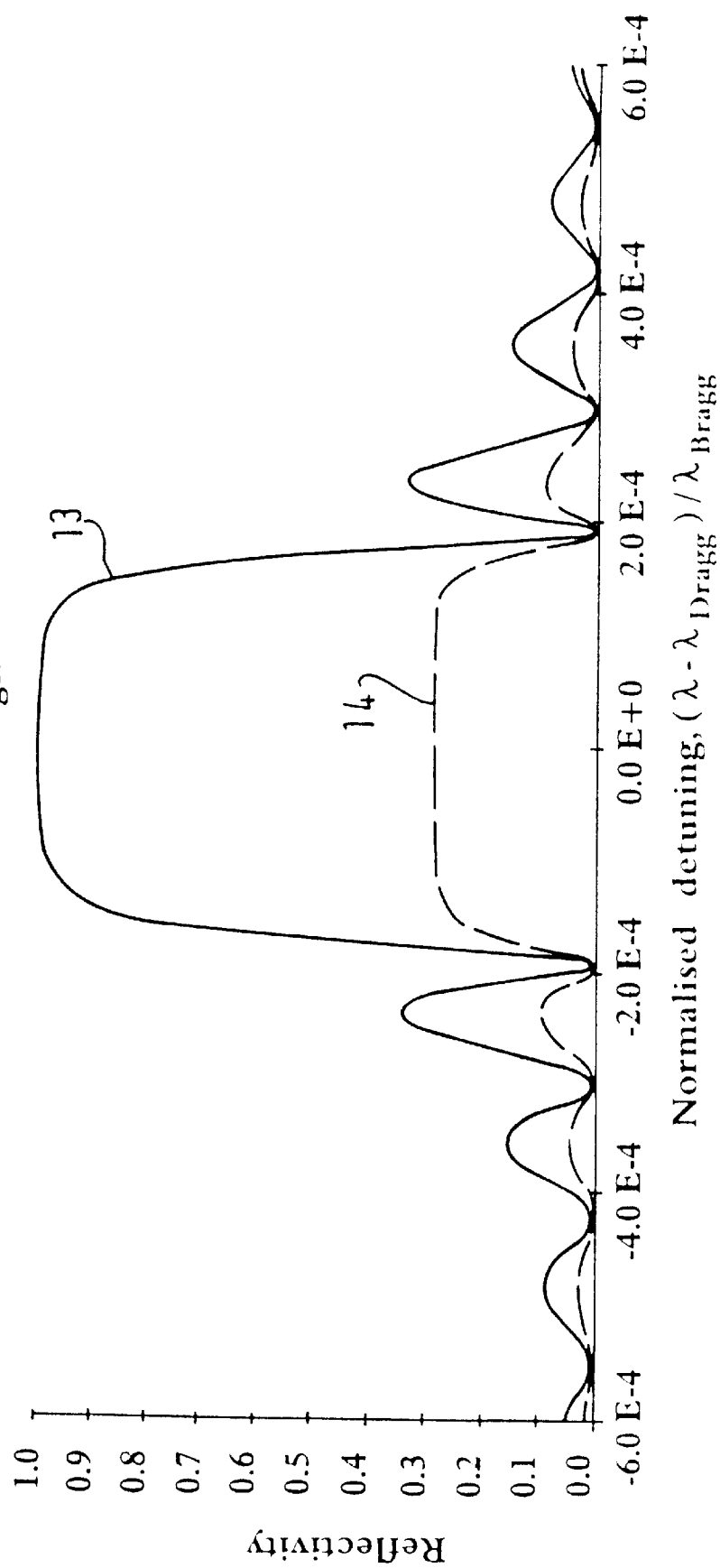
FIG. 2 is a bandpass diagram of the output of the interferometer shown in FIG. 1, when operating according to the prior art.

The remainder of the bandwidth of light from amplifier 10 passes through the gratings 8, 9, without reflection to the outputs 11, 12 of the fibres 4, 5, the energy having been split equally between the outputs 11, 12 by virtue of the 50:50 splitting characteristic of the coupler 3. FIG. 2 illustrates the bandpass characteristics of the output at port P2. Trace 13 illustrates the reflectivity of the filter at port P2 when an exact π/2 phase difference at the Bragg wavelength occurs for the reflected energy from the gratings 8, 9 returned to the ports P3, P4 of the coupler. As previously explained, when this phase difference is π/2 at the Bragg wavelength, an output at the Bragg wavelength is produced solely at the output port P2 and the resulting pass band envelope 13 is of relatively high amplitude. However, when the phase relationship of the reflected light, at the two inputs at ports P3 and P4, moves slightly out of phase from this condition, for example when it increases to 3π/4, the amplitude of the resulting pass band envelope decreases as shown by trace 14, at the output port P2. Thus, in order to optimise the output at port P2, it is necessary to achieve an exact phase difference of π/2 between the reflected optical radiation at the Bragg wavelength of the gratings, arriving at input ports P3, P4. It will be understood that changes of temperature or strain on the fibres 4, 5 can affect the effective path length for light at the Bragg wavelength travelling in a round trip from output ports P3, P4 through the fibres 4, 5 to the gratings 8, 9 and then back to the ports P3, P4. Also, it is difficult to record the gratings 8, 9 so that the path length for the reflected Bragg radiation in the fibres 4, 5 is identical.

This problem is addressed in FIG. 1 by directing ultraviolet light 15 from a source 16, at the photosensitive fibres 4 and/or 5 in regions A or B in order to alter the refractive index of the fibre and hence the effective path length in each of the paths through the fibres 4, 5. In this way, the phase difference for light at the Bragg wavelength travelling in the fibres 4, 5 can be matched to achieve the optimised envelope 13 shown in FIG. 2 for the pass band of the filter at output port P2. The trimming of the optical path lengths is described in more detail in Kashyap R., Maxwell G. D., & Ainslie B. J., "Laser-trimmed four port band-pass filter fabricated in a single-mode photosensitive Ge-doped planar waveguide", IEEE. J. Photon Technol. 5 (2), 191–194, February 1993.

In accordance with the invention, a multiple-band-pass filter is achieved with the previously described apparatus, by phase de-tuning the reflective Bragg gratings 8, 9. In a first example, the phase de-tuning is achieved by providing asymmetrical optical paths in the fibres 4, 5 for light at the Bragg wavelength. In one example of the invention, the UV trimming process for the fibre regions A, B is carried out to produce a relative phase difference greater than $2\pi$ at the Bragg wavelength. At a wavelength of $\lambda$, the wavelength difference $\delta\lambda$ between the consecutive peaks may be easily shown to be:

$$\delta\lambda = \frac{\lambda^2}{2n\,\delta l} \quad (1)$$

where $\delta l$ is the path length difference between the arms, i.e. the optical paths in the fibres 4, 5. Thus, it is easy to design a band-pass filter with N transmission peaks by adjusting the path length difference to $$\delta l = \frac{N\lambda^2}{2n\Delta\lambda} \quad (2)$$

where $\Delta\lambda$ is the full (to the first zeroes of intensity) bandwidth of the grating.

As the path difference is increased from the tuned arrangement previously described, the pass band initially narrows and then splits into two. By increasing the path length difference further, multiple pass bands are produced in the reflective characteristic at output port P2, the multiple bands falling within the pass band envelope 13 shown in FIG. 2. The multiple pass bands are shown in more detail in FIG. 3. This shows the reflectivity of the filter at output port P2 for the path length difference $\delta l$=1.269 mm at the Bragg wavelength of the gratings 8, 9 which in this case was 1545 nm. It will be seen that the reflectivity has a pass band envelope 13 with a main lobe extending between 1543–1547 nm, with adjacent side lobes. Within the main lobe of envelope 13, are a series of equally wavelength spaced pass bands $18_1$–$18_6$. Each of the multiple pass bands 18 has a band width of approximately 0.75 nm. The amplitude of the peaks $18_1$–$18_6$ are approximately the same, to within ±10%. In accordance with the invention, it has been appreciated that these multiple pass bands can be used for WDM transmission systems. The filter can thus be used to pick out individual wavelengths for use as WDM telecommunication channels. Useful results can also be obtained when the amplitude of successive peaks lie within up to +/−50% of one another, with a bandwidth in a range of 0.5–2.0 nm.

Figure 3:
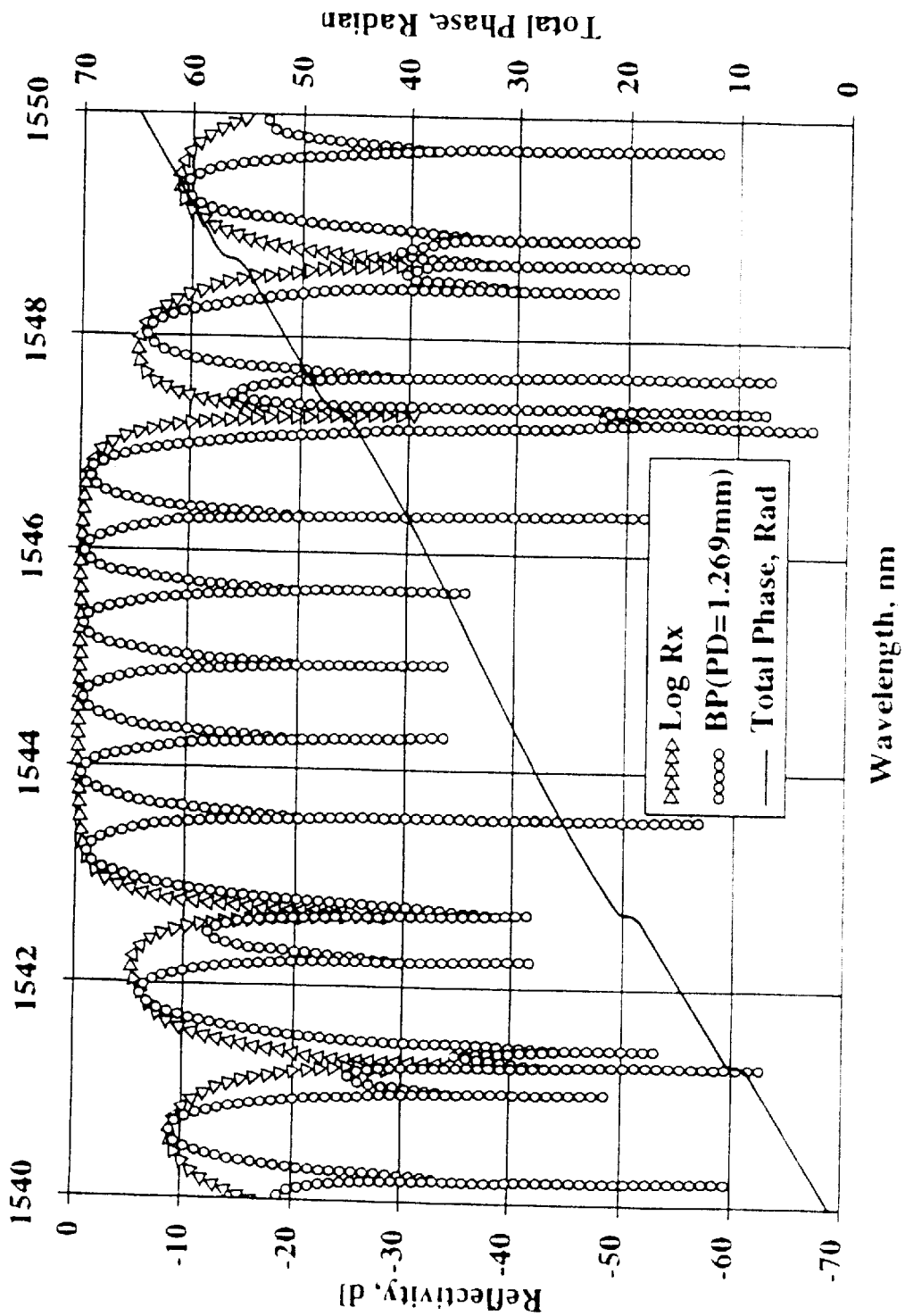
FIG. 3 is a graph of the reflection spectrum at port P2 of the interferometer shown in FIG. 1, when operating according to the invention.

In a modification, the Bragg gratings 8, 9 recorded in the fibres 4, 5 are apodised so as to reduce the side lobes in the characteristic shown in FIG. 3. Apodisation can be carried out as described in "A novel technique for apodisation of chirped and unchirped Bragg gratings" R. Kashyap et al, Electron. Lett, vol 32, no. 13, pp 1227–1228, 1996, in which a plurality of spatially periodic optical component patterns are recorded in the fibre with a relative spatial phase which varies such as to result in apodisation of the recorded grating.

Figure 4:
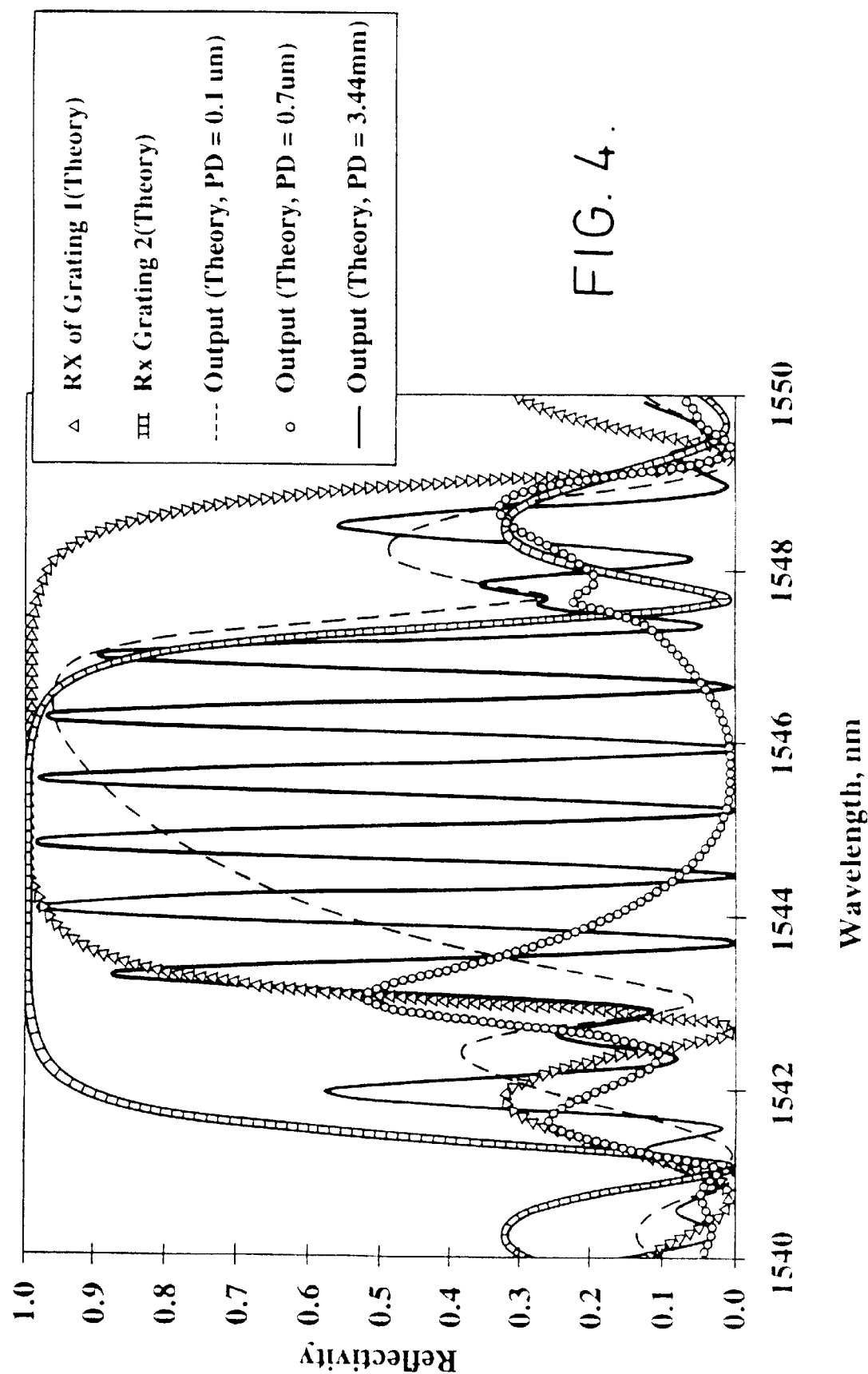
FIG. 4 illustrates the reflection spectrum when the wavelength reflection characteristics of the gratings shown in FIG. 1 have changed.

De-tuning of the reflective gratings can be achieved in another way, by altering the relative spatial periodicity of the gratings 8, 9 recorded in the fibres 4, 5 respectively. FIG. 4 illustrates the results for slight de-tuning (0.25×bandwidth) between the two Bragg gratings 8, 9. The traces 19, 20 illustrate the bandwidth of the gratings 8, 9 individually as measured at the output port P2 and the trace 21 illustrate the effect of increasing the path length difference, as previously described, in the two arms 4, 5 of the interferometer shown in FIG. 1. It can be seen that as the path length difference is increased, to be greater than several wavelengths of the Bragg reflection wavelengths, multiple pass bands occur in the output characteristic, shown by trace 21. Thus, multiple pass bands can be achieved even if the gratings 8, 9 are not exactly matched in terms of their Bragg wavelengths and chirped gratings can be used.

EXAMPLE

Using apparatus as shown in FIG. 1, two 0.4 mm long gratings 8, 9, with a full bandwidth of the order of 6.5 nm, were written into standard deuterated fibre lengths 4, 5, which were joined by means of the splices 6, 7 to the ports P3, P4 of the coupler, with a path length difference of ~3 mm. The gratings had nominal reflectivities of ~100% for the Bragg wavelength.

Figure 5:
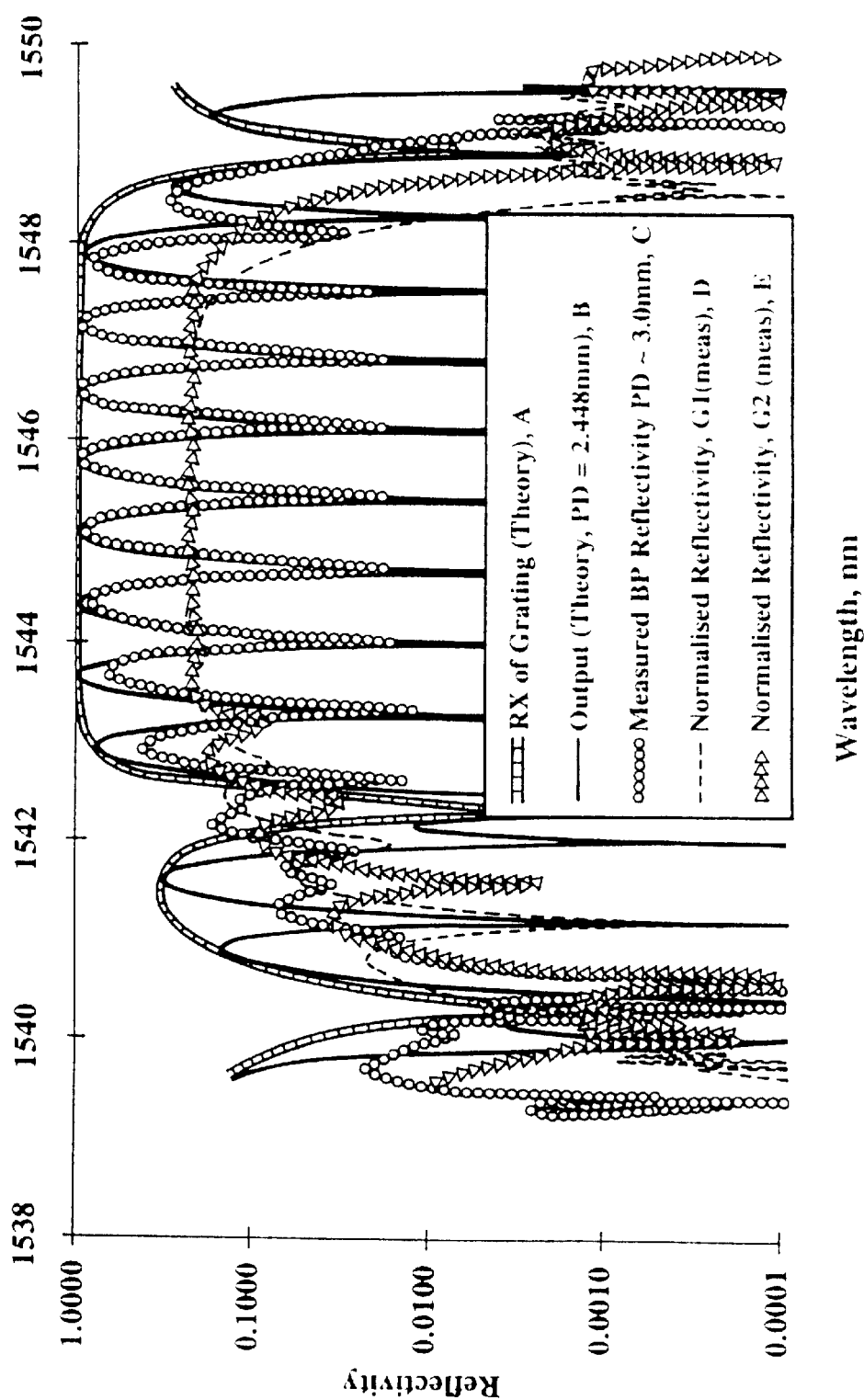
FIG. 5 illustrates the reflection spectrum of the filter of FIG. 1 when operating in accordance with the invention.

FIG. 5 shows the measured reflectivity of each grating in turn (graphs D and E), as used in the interferometer of FIG. 1. The measurement was made by bending the appropriate fibre 4 or 5 between the coupler in each grating 8, 9 while the other was being measured. The bandpass spectrum was measured by allowing reflections from both gratings 8, 9 to interfere in the coupling region 3. The peak reflectivity was then used to normalise all of the data shown in FIG. 5. The peak reflectivity of the bandpass was of the ratio of the order of 4:1 with respect to the individual grating reflectivity. The resulting bandpass spectrum (graph G) can be seen to include multiple pass bands each with a bandwidth of the order of 0.5 nm. Polarisation was adjusted to optimise the extinction outside of the individual pass bands. When the arms of the Michelson Interferometer were held in close proximity to one another in the same environment, the bandpass spectrum remained stable. The individual pass bands can be moved within the bandwidth of the gratings by altering the phase in one of the paths in the fibres 4, 5, between the ports P3, P4 and the gratings 8, 9. This effect can be used in order to tune the grating dynamically in order to position particular WDM channels in terms of wavelength.

Figure 6:
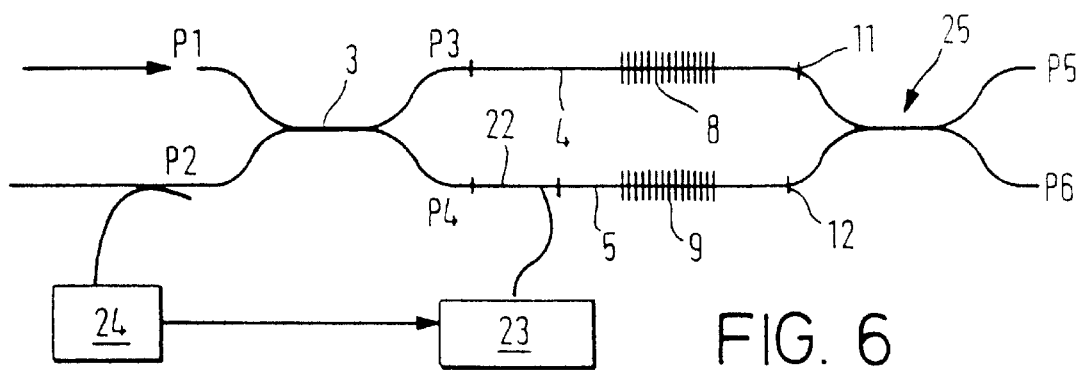
FIG. 6 illustrates another embodiment of a filter according to the invention, using a Mach Zehnder interferometer.

An embodiment for this purpose is shown in FIG. 6 in which like parts are marked with the same reference numbers as those shown in FIG. 1. The filter device is used to filter a number of WDM channels that are input to port P1. The channels may have a channel configuration corresponding to those of the filter, for example with a channel spacing as shown in FIG. 5. A length of poled fibre 22 is spliced between the fibre 5 and the output P4 in order to adjust the relative path lengths in the fibres 4, 5 for light reflected by the gratings 8, 9 at the Bragg wavelength. The poled fibre 22 may be fabricated as described by Fujiwara et al, Electron. Lett., vol 31, no 7, p573, 1995 in which an optical fibre is described, which is formed with longitudinal apertures that extend towards its core through its cladding region. The apertures receive electrode wires which run along the fibre. A potential difference is applied between the electrode wires so as to induce a change of refractive index in the fibre core. By changing the refractive index of the fibre electrically, it is possible to tune the positioning of the pass bands of the filter shown in FIG. 6. A voltage source 23 is coupled to the fibre 22 so as to vary the potential difference applied to the poled fibre and thereby tune the wavelength disposition of the multiple pass bands produced at the port P2. The light fed into port P1 may have been degraded by virtue of transmission over a long distance, and the result of the filtering process at port P2 is to configure the transmitted optical radiation into the desired closely spaced WDM channels. In order to dynamically lock the filter characteristics to the desired wavelength range, a wavelength sensor 24 may be coupled to the output port P2 in order to provide an electrical feed-back signal to the voltage source 23 so as to control the path length difference produced by use of the poled fibre 22. For details of a suitable control system, reference is directed to R. Kashyap & B. K. Nayar "An all single-mode Michelson interferometer sensor" IEEE J. Tech. Lett., vol. LT-1, no. 3, p359, 1982.

Also, as shown in FIG. 6, the filter according to the invention may make use of a Mach Zehnder interferometer; the device of FIG. 6 includes a further coupler 25 which corresponds to the coupler 3 and combines light transmitted through the gratings 8, 9, which then passes to output ports P5, P6, after combination in the coupler 25, in a manner well known per se. It will be understood that for optical radiation transmitted through the gratings 8, 9, the device functions simply as a band-stop filter across the full bandwidth of the gratings 8, 9. However, the multiple band-pass function provided by the filter can be used from either end of the configuration shown in FIG. 6. Thus, for light input at port P1, the multiple band-pass characteristic is exhibited at port P2. Alternatively, for light input to port P5, differential path lengths to the filters 8, 9 can be used to provide a multiple pass bands at port P6.

Figure 7:
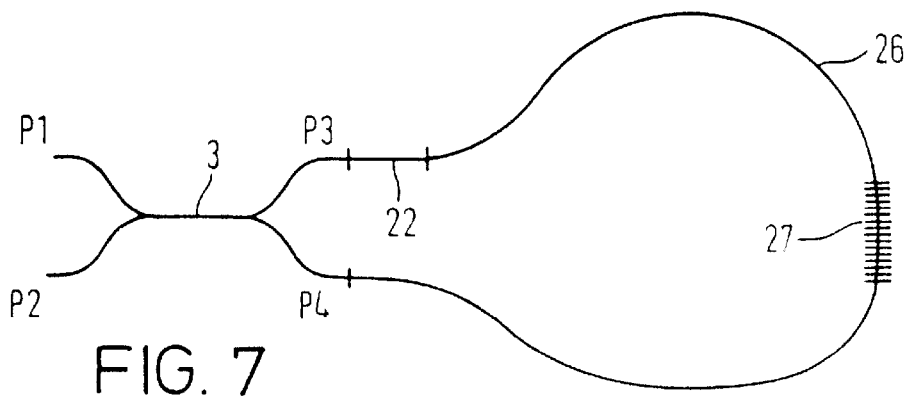
FIG. 7 illustrates another embodiment of filter according to the invention that uses a Sagnac-loop.

Another embodiment of the invention is shown in FIG. 7, in the form of a Sagnac-loop interferometer.

In this embodiment, the four port coupler 3 has an optical fibre loop formed between its ports P3, P4. The loop includes a length of UV photosensitive optical fibre 26 into which a single refractive index grating 27 is recorded, such that the path lengths of the fibre from the ports P3, P4 to the grating are unequal. A length of electrically poled fibre 22 corresponding to that shown in FIG. 6 may also be included in the loop. The fibres may be connected using conventional fusion splices. Light input to port P1 is split between the ports P3 and P4 as previously described and thus travels in both directions around the loop to the fibre grating 27. This reflects light at the Bragg wavelength in opposite directions back to the ports P3, P4, so as to be directed to the output port P2 at the Bragg wavelength, as previously described. The relative path lengths in the clockwise and anticlockwise direction around the loop can be controlled by the poled fibre 22, by changing its refractive index in the manner previously described. This embodiment has the advantage that only a single refractive grating 25 need be recorded, which improves stability.

The described examples of asymmetric interferometer according to the invention each constitute a non-resonant device, unlike a Fabry Perot interferometer. The devices according to the invention exhibit a sinusoidal response giving rise to the multiple band-passes within the envelope of the reflection spectrum of the grating, with a 1:1 mark-space ratio, i.e. the devices do not have band-stops wider than the band-passes. All the band-passes do however maintain a specific phase relationship determined by the phase characteristic of the gratings. Thus, this type of a band pass filter is ideally suited to applications requiring wavelength slicing as well as signal processing of ultra-fast optical pulses requiring good control of the phase between the frequency components of the pulse.

The filter shown in FIG. 1 performs well as a WDM multiplexer to produce light in WDM channels defined by its closely spaced pass bands. With the source 10 omitted, the filter of FIG. 1 can be used as a de-multiplexer to constrain light in the WDM channels, after transmission through an optical network, back into the channels defined by the filter. Also, as described with reference to FIG. 6, the filter can be easily adapted for any particular wavelength spacing within the bandwidth of the gratings 8, 9 to provide selectable WDM channel wavelengths. In one example, a bandpass filter with a physical path length difference of 0.25 mm between the paths 4, 5 was fabricated with a pair of near identical gratings 0.4 mm long, with a bandwidth of 6.5 nm centred on a Bragg wavelength of 1550 nm. This gave a channel spacing in the output port P2 of 0.035 nm with approximately 195 channels within the bandwidth of the grating, each with approximately the same extinction ratio, other than the ones close to the edges of the grating reflection spectrum.

What is claimed is:

1. A multi-band-pass filter comprising:
   a splitter operative to split optical radiation incident thereon into first and second optical paths,
   a combiner to combine optical radiation from the first and second paths to provide an optical filter output, and
   reflective means in the paths, to reflect optical radiation from the splitter to the combiner,
   the reflective means being de-tuned so that the filter output provides a plurality of separate, wavelength spaced pass bands for the incident radiation.

2. A filter according to claim 1, de-tuned in that the optical path lengths presented to the radiation travelling from the splitter to the combiner and reflected by the reflective means, are sufficiently different to produce said plurality of separate pass bands in the filter output.

3. A filter according to claim 1 de-tuned in that the reflective means exhibits in reflection for said first and second paths, respective different pass bands for the incident radiation, which on combination in the combiner, results in said plurality of separate pass bands in the filter output.

4. A filter according to claim 1 wherein the splitter is operative to split incident relatively broadband optical radiation into the first and second optical paths, and the reflective means includes first and second reflective elements in the paths respectively, each having a relatively narrow band reflective characteristic for reflecting radiation from the splitter to the combiner.

5. A filter according to claim 4 wherein the plurality of pass bands in the filter output are disposed within the envelope of the reflection pass band of at least one of the reflective elements.

6. A filter according to claim 4 wherein the path lengths presented by the first and second paths differ by a length greater than that corresponding to a wavelength of the radiation reflected by the individual reflective elements.

7. A filter according to claim 4, wherein the reflective elements each exhibit a substantially identical pass band envelope.

8. A filter according to claim 1 in which the reflectivity in each of the pass bands has substantially the same maximum value within at least a given wavelength range of the filter output.

9. A filter according to claim 1 wherein the splitter and the combiner comprise a four port coupler, with a first of the ports being configured to receive the incident radiation, a second and third of the ports being configured to direct the split radiation to the first and second paths and to receive the reflected radiation from the reflective means, and the fourth port provides the filter output.

10. A filter according to claim 9 wherein the coupler comprises an optical fibre coupler.

11. A filter according to claim 1 wherein the reflective means comprise at least one Bragg grating.

12. A filter according to claim 1 wherein the reflective means comprise at least one refractive index grating recorded in optical waveguide.

13. A filter according to claim 11 including first and second ones of the gratings, in the first and second paths respectively.

14. A filter according to claim 13 wherein the gratings have the same spatial periodicity.

15. A filter according to claim 13 wherein the gratings have different periodicities.

16. A filter according to claim 11 wherein the or each of the gratings is apodised.

17. A filter according to claim 11 wherein the or each of the gratings is a chirped grating.

18. A filter according to claim 1 including a control device in one of the paths for adjusting said optical path difference.

19. A filter according to claim 18 wherein the control device has a variable refractive index.

20. A filter according to claim 19 including means for adjusting the refractive index of the control device, electrically.

21. A filter according to claim 1 wherein the first and second paths are connected together in a loop.

22. A filter according to claim 1 wherein the first and second paths are connected to a further combiner.

23. A filter according to claim 1 including optical fibre to provide said first and second paths.

24. A multiple pass band optical filter comprising an interferometer with relatively detuned reflective elements that produce multiple, separate, substantially equal reflectivity pass bands in the interferometer's output.

25. A multiple pass band optical filter comprising a two-path interferometer with de-tuned reflective elements in the paths, that produce multiple, separate, substantially equal reflectivity pass bands in the interferometer's output.

26. A filter according to claim 24 wherein at least a group of the pass bands each have an individual bandwidth of the order of 0.5–2.0 nm and the same peak reflectivity within +/−10%.

27. A filter according to claim 26 wherein the group includes 5 of said pass bands.

28. A filter according to claim 24 wherein the interferometer comprises a Michelson, Mach-Zehnder or Sagnac-loop interferometer.

29. A device for providing optical radiation in a plurality of WDM channels, comprising a source of relatively broad-band optical radiation, and a filter according to claim 1, whereby the pass bands of the filter individually provide optical radiation from the source for the WDM channels.

30. A method of configuring a multi-band pass filter that comprises a splitter operative to split incident optical radiation within a given bandwidth into first and second optical paths, a combiner to combine optical radiation from the first and second paths to provide an optical filter output, and reflective means in the paths respectively, to reflect radiation from the splitter to the combiner, the method comprising:

de-tuning the reflective means so that the filter output provides a plurality of separate pass bands for the incident radiation each centred on a different wavelength within the bandwidth.

31. A method according to claim 30 wherein the de-tuning is carried out by adjusting the difference in the optical path lengths presented to the radiation travelling from the splitter to the combiner and reflected by the reflective means, to be sufficiently large to produce said plurality of separate pass bands in the filter output.

32. A filter according to claim 30 wherein the de-tuning is achieved by configuring the reflective means to exhibit in reflection for said first and second paths, respective different pass bands for the incident radiation, which on combination in the combiner, provide said plurality of separate pass bands in the filter output.

* * * * *